United States Patent [19]

Goulter

[11] Patent Number: 4,955,971
[45] Date of Patent: Sep. 11, 1990

[54] MULTI-PURPOSE TOOL UTILIZING ARMS WITH PARALLELOGRAM COUPLING AT PROXIMAL ENDS

[76] Inventor: Victor H. Goulter, 485 Molimo Dr., San Francisco, Calif. 94127

[21] Appl. No.: 335,738

[22] Filed: Apr. 10, 1989

[51] Int. Cl.$^5$ .............................................. A47J 43/28
[52] U.S. Cl. .......................................... 294/7; 294/3; 7/110
[58] Field of Search .................. 294/7, 8, 9, 10, 11, 294/2, 3, 49, 51, 50.8; 7/109, 110, 112; 30/150

[56] References Cited

U.S. PATENT DOCUMENTS

| | | | |
|---|---|---|---|
| 110,211 | 12/1870 | Davis | 294/50.8 X |
| 156,096 | 10/1874 | Maranville | 294/3 X |
| 629,003 | 7/1899 | Cox | 294/10 |
| 756,727 | 4/1904 | Stengel | 294/2 |
| 804,148 | 11/1905 | Maxwell | 294/10 |
| 1,534,202 | 4/1925 | Boley et al. | 30/150 |
| 1,643,456 | 9/1927 | James | 294/2 X |
| 1,895,214 | 1/1933 | Stork | 294/50.8 X |
| 3,464,730 | 9/1969 | Gagliardi et al. | 294/7 X |
| 3,833,250 | 9/1974 | Lawrence | 294/50.8 X |

Primary Examiner—Margaret A. Focarino
Assistant Examiner—Dean J. Kramer
Attorney, Agent, or Firm—David Pressman

[57] ABSTRACT

A multi-purpose tool, most useful for barbeque work, comprises a pair of parallel arms with barbeque implements at distal ends thereof and which are hingedly joined by a pair of spaced cross members so as to form a movable parallelogram at the other end thereof. This allows the tool to be adjusted in either of two positions so that the arms are adjacent and parallel with the distal end of either arm projecting forward so that its implement can be used alone, or with the arms parallel and spaced apart so that the arms can be squeezed together so that the implements can used as a pair of tongs. One implement is a fork and the other is a spatula. A pair of handles are provided in the middle of the arms. A grasping and hanging ring is attached to the middle of the end cross member. One end of the end cross member is pivotably attached to its arm by a bolt and thumbscrew so that it can be loosened and the parts can be thereafter locked in position; the pivot includes a detent lock for holding the cross member and arm orthogonally. The pivots are preferably formed at locations offset from the arms.

11 Claims, 2 Drawing Sheets

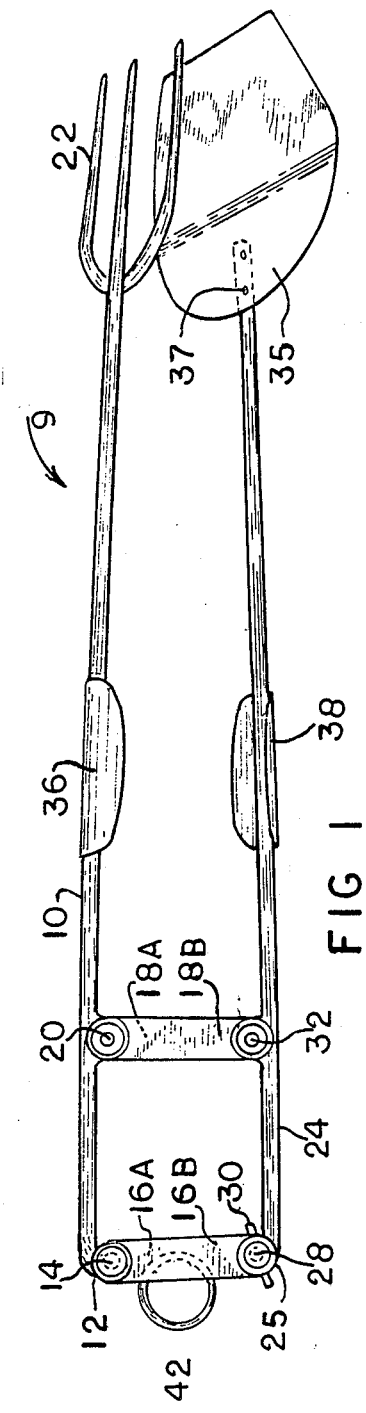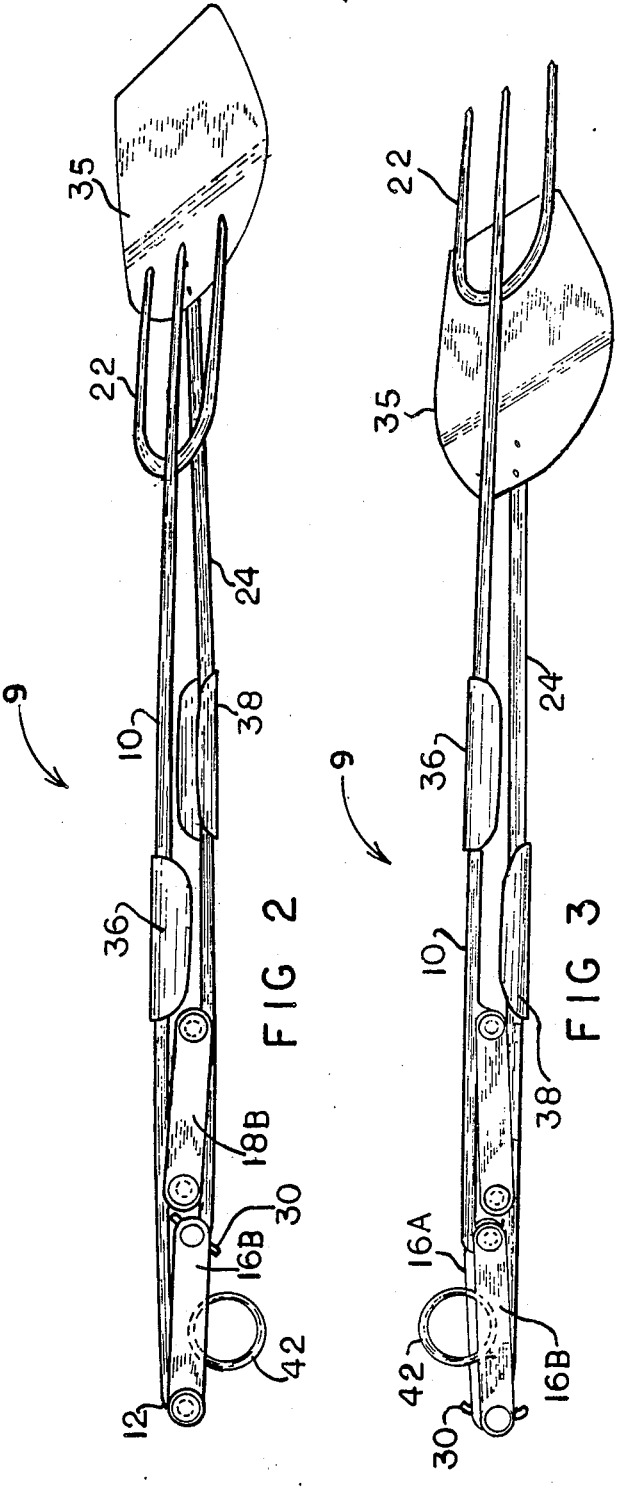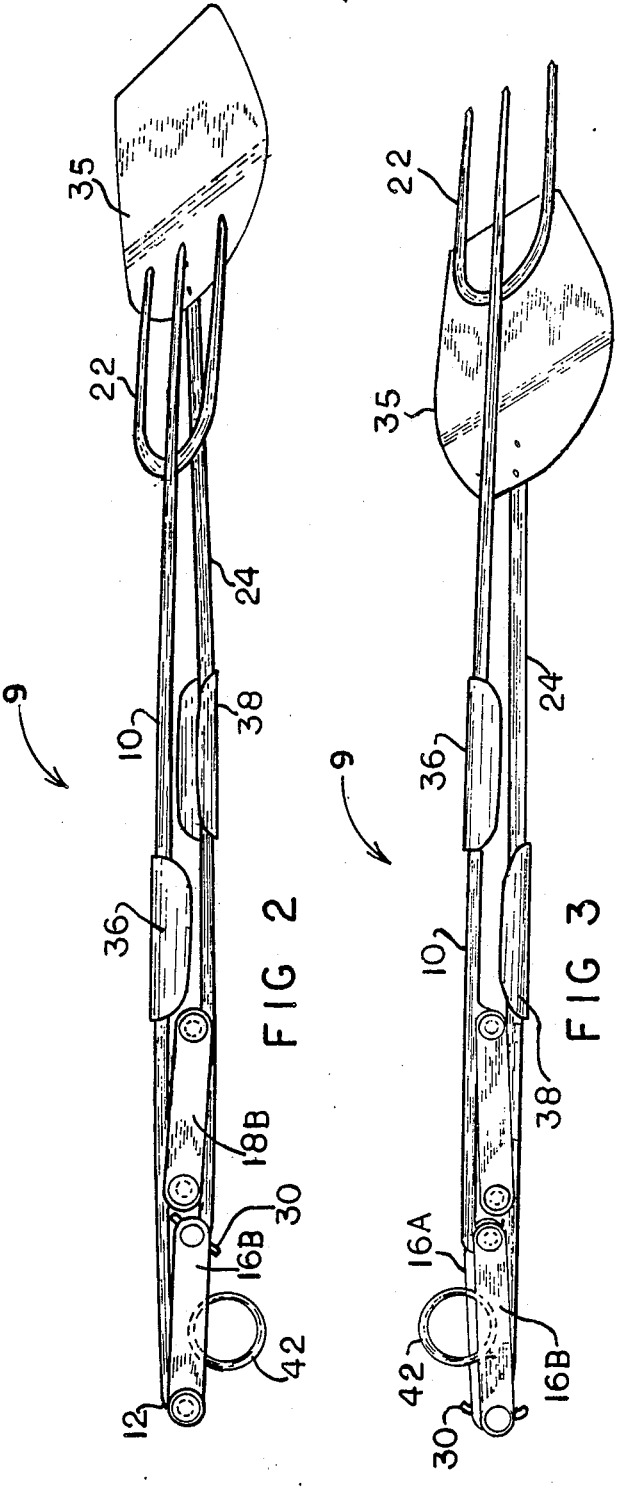

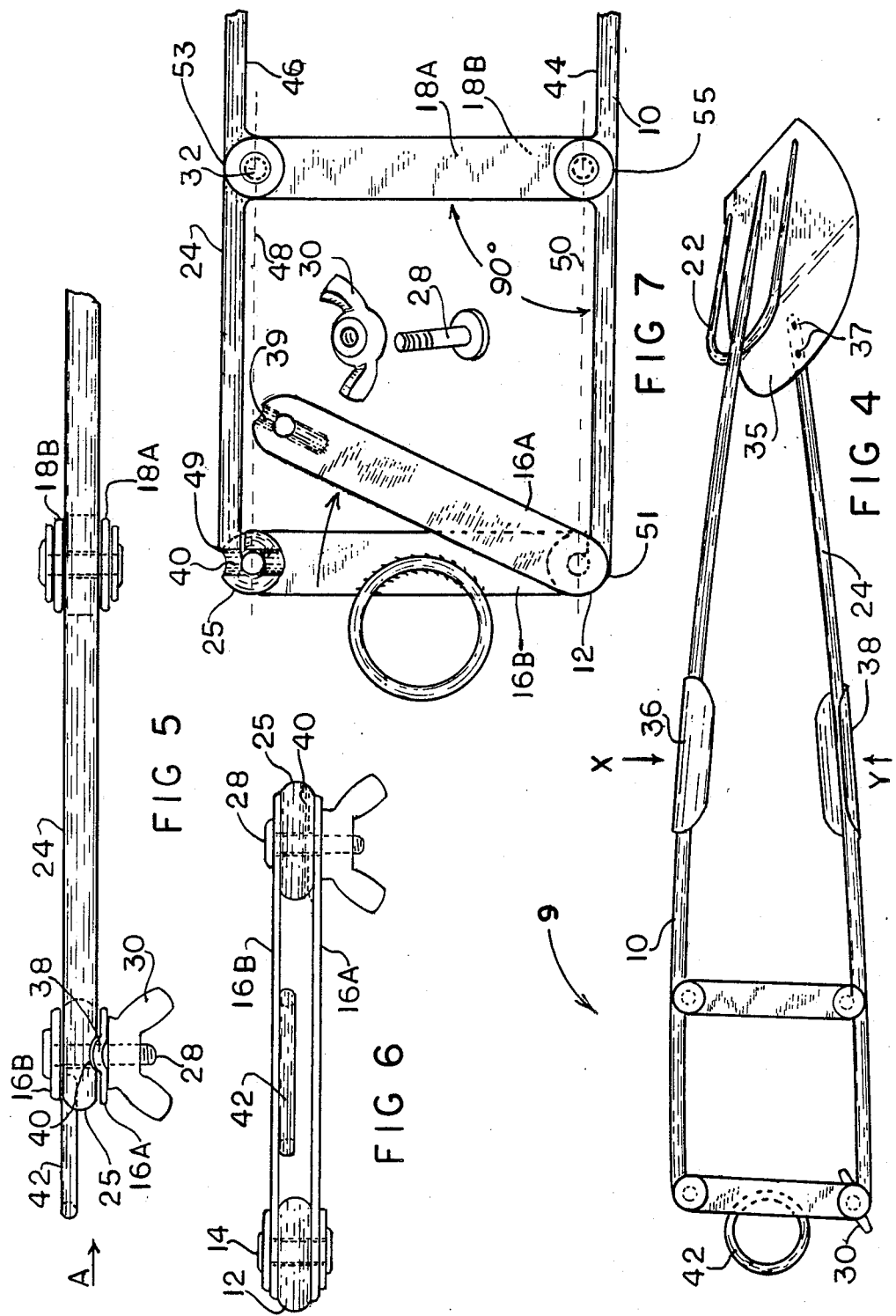

MULTI-PURPOSE TOOL UTILIZING ARMS WITH PARALLELOGRAM COUPLING AT PROXIMAL ENDS

BACKGROUND--FIELD OF INVENTION

The present invention relates to a barbeque tool, in particular to such a tool which can provide multiple functions.

BACKGROUND--DESCRIPTION OF PRIOR ART

In the past, when barbequing food on a grill or plate, the chef or cook generally used three tools, a pair of tongs, a long fork, and a spatula. The fork was used to turn steak ,chops, and the like, the spatula to turn eggs, onions, potato chips etc., and the tongs were used to pick up and remove selected foods which had become cooked.

These tools were placed or hung in a convenient position on or near the barbeque stand. However, if placed on the stand they would become hot, and if hung elsewhere they were not so readily available when needed. Also the act of changing from one tool to another was time consuming and inconvenient.

OBJECTS AND ADVANTAGES

Accordingly, several objects and advantages of the invention are to provide barbeque tools which can be used in sequence without becoming hot and which can be selected or changed conveniently. Other objects are to provide a single implement which provides three barbeque tools, a fork, a spatula, and a pair of tongs in combination, to provide an implement which can be changed rapidly from spatula to fork, or fork to a pair of tongs, or from tongs to spatula, and to provide an implement which is reasonably lightweight, convenient to use, and quick to change. A further advantage is to provide an implement which can be packaged, stored, shipped, displayed, packed-for-camping, manufactured easily and inexpensively, and function well as the same tools when made separately. Further advantages are to provide such a tool which can be hung on only one hook including a chefs belt hook. A still further advantage is to provide a tool with an amusing uniqueness in mechanical technology. Still further objects and advantages will become aparant from a consideration of the ensuring description and accompanying drawings.

BRIEF DESCRIPTION OF DRAWINGS

FIG. 1 is a perspective view of a tool according to the present invention.

FIG. 2 is a perspective view of the tool adjusted for use as a spatula.

FIG. 3 is a perspective view of the tool adjusted for use as a fork.

FIG. 4 is a perspective view of the tool locked to form a pair of tongs.

FIG. 5 is a top view of a handle end of the tool showing a wing nut and locking grooves used in the tool.

FIG. 6 is an end view taken in the direction of arrow A of FIG. 5 showing the locking groove.

FIG. 7 is a partly dismantled side view of a hinged end of the tool showing the locking groove and protruding ridge.

Reference Numerals
9 tool
10 bar or arm
12 proximal end
14 pivot pin
16A and 16B cross blades
18A and 18B second pair of cross blades
20 pivot point
22 fork
24 bar or arm
25 coiled-around end
28 pivot bolt
30 wing nut
32 pivot point
35 spatula blade
36 and 38 hand grips
37 rivets
39 ridge
40 groove
42 ring
44 and 46 inner faces
48 and 50 broken lines
49, 51, 53, and 55 cross blade ends

DETAILED DESCRIPTION OF THE PREFERRED EMBODIMENT

FIG. 1 shows a side view of a combination tool 9 according to the invention. Tool 9 comprises a bar or arm 10 which extends from a proximal end 12 where it is coiled around and hinged by a pivot pin 14 to a pair of parallel cross blades 16A (lower) and 16B (upper), best seen in FIG. 6. A working implement, namely, a three pronged fork 22, is formed or attached at the opposite or distal (working) end of bar 10.

A second bar 24 is similiarly hinged at its end 25 to the opposite ends of cross blades 16A and 16B by a pivot bolt 28 which is threaded and carries a wing nut 30 as best seen in FIGS. 5 and 6. A second pair of cross blades 18A and 18B is also hinged to bar 24 by a pivot pin 32. The opposite end of bar 24 is fitted with a spatula blade 35 by rivets 37.

Bars 10 and 24 are thus held apart by two pairs of cross blades (16A, 16B, 18A, 18B) which are pivoted to the bars in a parallelogram arrangment. Bars 10 and 24 are free to move back and forth in relation to each other when wing nut 30 is loose, as shown in FIGS. 2 and 3. However, if wing nut 30 is tightened when the ends of bars 10 and 24 are directly opposite each other, the bars will be held rigidly in relationship to each other and will form a 90-degrees angle to both pairs of cross blades 16A and 16B and 18A and 18B, as shown in FIG. 1. In this position the unit resembles a pair of tongs, wherein the spatula forms one half of the tongs and the fork forms the other half.

About midway along bars 10 and 24 hand grips 36 and 38, respectively, are attached such that they are opposite each other when the tool is locked in the "tongs" position of FIG. 1. Hand grips 36 and 38 are each formed of generally rectangular piece of metal with rounded corners which is bent to form a channel. The grips form comfortable handles for using the unit as a pair of tongs.

When wing nut 30 is loosened sufficiently, bar 10 can be swung forward in relation to bar 24 as shown in FIG. 3, thus causing fork 22 to protrude forward beyond spatula blade 35 such that it can be used for turning steak, chops, and the like. Alternatively, bar 10 can be swung backwards (FIG. 2) thus leaving spatula blade 35 protruding forward of fork 22 and in a position to be used for turning eggs, onions, potato chips, etc., over.

When bars 10 and 24 are positioned by tightening wing nut 30 as shown in FIG. 1, hand pressure can be applied in the direction of arrows X and Y (FIG. 4) against hand grips 36 and 38, thus causing fork 22 and spatula 35 to come together so that the user can clamp and hold foodstuffs therebetween.

FIGS. 7 shows a partly dismantled view of bolt-wing nut locking mechanism 28–30. Wing nut 30 and bolt 28 have been removed and cross plate 16A swung out of position so as to expose coiled-around end 25 of bar 24. Note that groove 40 is formed in end 25. Cross plate 16A has a complimentary ridge 39 so that when in position on pivot bolt 28 (FIGS. 5 and 6) and under of pressure of wing nut 30, ridge 39 will mate with groove 40, thus locking cross plate 16A in a 90-degree angle position with bar 24 as shown in FIGS. 4 and 1. However, one half to one turn of wing nut 30 will allow ridge 39 to disengage from groove 40 sufficiently for bar 10 to be moved forward as far as it will go as shown in FIG. 3 to become primarily a fork, or be moved as far as it will go in the opposite direction to become primarily a spatula, as shown in FIG. 2.

A hanging ring 42 is soldered, otherwise attached to, or made integral with either of cross plates 16B or 16A for the purpose of hanging the unit onto a hook on or near the barbeque stand, or more conveniently onto a hook attached to the user's belt. Hanging ring 42 is also used as a handle to flip the implement over from spatula to fork or tongs as required.

Side bars 10 and 24 preferably are made from 5mm (3/16 in) diameter steel having a good return-to-shape property. The total length of the bars is 42cm (16½ in) and they are spaced 76mm (3 in) as in FIG. 1. The spacing between pivot points 20 and 32, or between pivot points 14 and 28 is 60mm (2⅜ in) and between 14 and 20 or 28 and 32 it is 74mm (2⅞ in).

It will thus be seen that points 14, 28, 20 and 32 are positioned inwardly from inner faces 44 and 46 of the bars, along broken lines 48 and 50. This gives the implement more graceful lines and a better appearance in all three positions of use, also it prevents cross blade ends 49, 51, 53, and 55 from presenting uncomfortable bulges along the handle part as would occur if the pivot points were, for example, in the center of bars 10 and 24.

Summary, Ramifications and Scope

Thus the reader will see that I have provided a single implement which can provide three functions, squeezable tongs, a spatula, or a fork. It can easily be adjusted to either of its three positions by simply moving the fork (bar 10) forward, the spatula (bar 24) forward, or locking it in the tongs position (FIG. 1). It avoids the aforementioned problem of three separate instruments as used in the prior art since it effectively provides all three implements in one device, yet it is lightweight, easy to use, ship, display, etc.

While the above description contains many specificities, the reader should not construe these limitations on the scope of the invention but merely as exemplifications of preferred imbodiments thereof. Those skilled in the art will envision that many other possible variations are within its scope, for example skilled artisans will readily be able to change the dimentions and shapes of the various embodiments, such as by making the implement longer, wider, or shorter or even with different fittings, such as a knife and spoon, a pencil and eraser, a Phillips screwdriver and a cross-blade screwdriver, etc. Also the materials could be changed from steel to any other suitable metal, or even a suitable plastic. The inner crosspieces could even be replaced with flexible cable or strop or the pivot points replaced with flexible joints.

Accordingly, the reader is requested to determine the scope of the invention by the appended claims and their legal equivalents, and not by the examples which have been given.

I claim:

1. A multi-purpose tool, comprising:

first and second elongated arms, each arm having a proximal end and a distal end at the end opposite said proximal end, each arm comprising first and second portions, said first portion being at said proximal end and said second portion comprising the rest of each arm, including said distal end thereof, said first portion being shorter than said second portion;

said distal end of each arm having a working implement thereat;

joinder means for joining said proximal ends of said arms together, said joinder means comprising first and second crossarms, each crossarm comprising a member having first and second ends;

said first ends of said crossarms being hingedly attached to said first arm at spaced locations thereon, said locations defining said first portion of said first arm, said second ends of said crossarms being hingedly attached to said second arm at spaced locations thereon, said locations defining said first portion of said second arm, said second locations corresponding, respectively, to the locations on said first arm where said first ends of said crossarms are attached, such that said crossarms and said first portions of said arms intermediate said locations where said ends of said crossarms are attached form an adjustable parallelogram at said proximal ends of said arms;

said second portions of said arms extending away from said paralleogram;

each arm being hingedly joined to each of said crossmembers at locations on each arm which are offset from each arm;

whereby said arms can be moved to and held in any one of the following three working relationships:

(a) said arms are adjacent and parallel to each other with said distal end of one arm projecting forward of said distal end of the other arm so that said working implement at said distal end of one arm can be used alone, (b) said arms are adjacent and parallel to each other with said distal end of said other arm projecting forward of said distal end of said one arm so that said working implement at said distal end of other arm can be used alone, and (c) said arms are spaced from and parallel to each other with said distal end of one arm opposite said distal end of said other arm so that when said arms are grasped between said ends thereof and squeezed together, said working implements at said distal ends of said arms will be brought together so that said working implements can be used together.

2. The tool of claim 1, further including a grasping member attached to one of said crossmembers between said opposite ends thereof.

3. The tool of claim 1 wherein the hinted attachment between one of said crossmembers and one of said arms also includes means for locking said crossmember and said arm together in an orthogonal relationship.

4. The tool of claim 1 wherein said working implements on said respective arms are a fork and a spatula, so that said tool can be used for barbequing by using said fork alone, said spatula alone, or said fork and said spatula together as a grasping tongs.

5. The tool of claim 1, further including a pair of handles attached to said respective arms at a place on said second portion of each arm between the ends thereof, such that said arms can be manually squeezed together in a convenient manner.

6. The tool of claim 1 wherein said arms have a round cross section, said crossmembers are flat members, and one end of one of said crossmembers being hingedly joined to one of said arms by a bolt and thumbscrew, and further including means for locking said one crossmember and said one arm together in an orthogonal relationship.

7. A multi-purpose barbeque tool, comprising:
first and second elongated arms, each having a proximal end and a distal end opposite to said proximal end thereof;
said distal end of each arm having a working barbeque implement thereat;
joinder means for joining said arms together so that said arms can be moved to and held in any one of the following three working relationships:
  (a) said arms are adjacent and parallel to each other with said distal end of one arm projecting forward of said distal end of the other arm so that said working implement at said distal end of one arm can be used alone,
  (b) said arms are adjacent and parallel to each other with said distal end of said other arm projecting forward of said distal end of said one arm so that said working implement at said distal end of other arm can be used alone, and
  (c) said arms are spaced from and parallel to each other with said distal end of one arm opposite said distal end of said other arm so that when said arms are grasped between said ends thereof and squeezed together, said working implements at said distal ends of said arms will be brought together so that said working implements can be used together;
said joinder means comprising first and second crossmembers, each of which has opposite ends, the ends of said first crossmember being pivotably joined between said proximal ends of said arms, the ends of said second crossmember being pivotably joined between said arms at corresponding locations on each arm intermediate the ends thereof and more closely spaced to said proximal end than said distal end thereof, such that said crossmembers and the portions of said arms therebetween form and can move in the fashion of a parallelogram, and such that said distal portions of said arms extend away from said paralleogram;
said proximal end of each arm being pivotably joined to a respective end of said crossmembers at a location offset from each arm.

8. The tool of claim 7, further including a pair of handles attached to said arms at a place on each arm spaced from said crossmembers and toward said distal end thereof, such that said arms can be conveniently manually squeezed together 9. A multi-purpose barbeque tool, comprising:
first and second elongated arms, each having a proximal end and a distal end opposite to said proximal end thereof;
the distal end of each arm having a working barbeque implement thereat,
joinder means for joining said arms together so that said arms can be moved to and held in any one of the following three working relationships;
  (a) said arms are adjacent and parallel to each other with said distal end of one arm projecting forward of said distal end of the other arm so that said working implement at said distal end of one arm can be used alone,
  (b) said arms are adjacent and parallel to each other with said distal end of said other arm projecting forward of said distal end of said one arm so that said working implement at said distal end of other arm can be used alone, and
  (c) said arms are spaced from and parallel to each other with said distal end of one arm opposite said distal end of said other arm so that when said arms are grasped between said ends thereof and squeezed together, said working implements at said distal ends of said arms will be brought together so that said working implements can be used together,
said joinder means comprising first and second crossmembers, each of which has opposite ends, the ends of said first crossmember being pivotably joined between said proximal ends of said arms, the ends of said second crossmember being pivotably joined between said arms at corresponding locations on each arm intermediate the ends thereof and more closely spaced to said proximal end than said distal end thereof, such that said crossmembers and the portions of said arms therebetween form and can move in the fashion of a parallelogram, and such that said distal portions of said arms extend away from said paralleogram;
said working barbeque implements on said arms being a fork and a spatula, so that said tool can be used for barbequing by using said fork alone, said spatula alone, or said fork and said spatula together as a grasping tongs, and
said proximal end of each arm being pivotably joined to a respective end of said crossmember at a location offset from each arm.

10. The tool of claim 9, further including a pair of handles attached to each of said arms at a place spaced from said crossmembers and toward said distal end thereof, such that said arms can be conveniently manually squeezed together.

11. The tool of claim 9 wherein each of said arms has a round cross section, said crossmembers are flat members, and one end of one of said crossmembers is pivotably joined to one of said arms by a bolt and thumbscrew, the pivot joinder between one of said crossmembers and said one arm further including means for locking said crossmember and said one arm together in an orthogonal relationship.

* * * * *